UNITED STATES PATENT OFFICE 2,142,988

RECOVERY OF SULPHUR DIOXIDE FROM GASES

Raymond F. Bacon, Bronxville, and Rocco Fanelli, New Rochelle, N. Y.; said Fanelli assignor to said Bacon No Drawing. Application December 24, 1935, Serial No. 55,987

3 Claims. (Cl. 23—178)

This invention relates to the recovery of sulphur dioxide and has for an object the provision of an improved process for recovering sulphur dioxide from gases containing sulphur dioxide mixed with other gases. The process of the invention may be employed for the recovery of sulphur dioxide from gas mixtures containing sulphur dioxide in any degree of concentration, and it is particularly suitable for the treatment of gas mixtures containing relatively small concentrations of sulphur dioxide, such, for example, as gas mixtures resulting from the roasting of pyrites, ores, concentrates and other metallurgical raw materials and products containing metal sulphides.

The process of the invention may be employed to produce a substantially pure sulphur dioxide product, in either gaseous or liquid form, or to produce gaseous products containing sulphur dioxide in any suitable proportions. The invention provides an effective and economical method for producing sulphur dioxide-bearing reagents for various chemical and metallurgical uses, as, for example, in the production of sulphuric acid, in the production of sulphite cooking liquors, in the production of elemental sulphur by reduction of the sulphur dioxide, in refrigeration and in the leaching of ores. The invention further provides an effective and economical method of reducing or eliminating the injurious effects resulting from discharging roaster and other smelter gases into the atmosphere, and, at the same time, permits the recovery in useful form of an important component of such injurious gases.

The process of the invention is of the type in which gases containing sulphur dioxide are treated with a liquid solvent or absorbent, and the absorbed sulphur dioxide is expelled by heating or by reduction of pressure with or without heating, the regenerated solvent or absorbent being used for the treatment of additional quantities of gases.

It has been proposed heretofore to employ concentrated aqueous solutions of soluble sulphites such as ammonium sulphite to absorb sulphur dioxide from gases containing the same. In view of the high solubility of ammonium sulphite at ordinary temperatures, concentrated solutions absorb large quantities of sulphur dioxide, ammonium bisulphite being formed. The absorbed sulphur dioxide is released by heating the bisulphite solutions, and a serious difficulty is encountered when the solutions are heated, ammonia or a sublimate of ammonium sulphite being driven off. This is explained, to some extent at least, by the fact that ammonium sulphite is a salt of a weak base and a weak acid, and, in water solution, it shows a fair hydrolysis into ammonium hydroxide and ammonium bisulphite according to the following equation:

$$(NH_4)_2SO_3 + H_2O \rightleftharpoons NH_4OH + NH_4HSO_3$$

The ammonium hydroxide formed is unstable and breaks down into ammonia gas and water at room temperatures. At higher temperatures, decomposition is extensive. It has been proposed to employ ammonium bisulphite in conjunction with the ammonium sulphite to retard or prevent hydrolysis.

We have found that any acid stronger than water and weaker than sulphurous acid can be used in place of the ammonium bisulphite to reduce hydrolysis of the ammonium sulphite. We have also found that such a system as ammonium sulphite+weak acid is far superior to the ammonium sulphite+bisulphite mixtures as absorbents for dilute sulphur dioxide. Not only do these solutions show better absorption of sulphur dioxide but also less oxidation to sulphate because of the smaller concentration of $SO_3$ and $HSO_3$ ions in the original solution. We have also found that these solutions of ammonium sulphite+weak acid after absorption of sulphur dioxide give up the absorbed sulphur dioxide more easily when the solutions are heated.

Any suitable acid stronger than water and weaker than sulphurous acid may be employed in carrying out the process of the invention. Preferably, the acid employed is one which is readily soluble in water and stable and substantially non-volatile at the temperatures employed in liberating the absorbed sulphur dioxide.

The following example illustrates results obtained in the treatment of gases containing about 6% of sulphur dioxide with ammonium sulphite solutions containing lactic acid.

| Grams of ammonium sulphite per liter | Grams of lactic acid per liter | Grams of $SO_2$ absorbed per liter of sol. | Percent $SO_2$ recovered on distillation for 10 minutes at 105° C. |
|---|---|---|---|
| 147 | 68 | 82 | 67 |
| 147 | 100 | 75 | 98 |
| 290 | 210 | 128 | 82 |
| 340 | 242 | 145 | 82 |
| 375 | 269 | 152 | 76 |
| 360 | 300 | 128 | 93 |

In carrying out a process of the invention, the sulphur dioxide-bearing gases may be treated with the absorption solution in any manner known to the art of contacting gases and liquids. Thus, for example, the gases may be passed over the surface of a body of solution, with continuous or intermittent agitation of the solution, the gases may be bubbled through a body of the solution, or the gases and the solution may be passed, either co-currently or counter-currently, through a packed tower in contact with one another.

If gases such as roaster gases are being treated, they are preferably cooled and treated for the removal of dust and other objectionable impurities contained therein prior to treatment with the absorption solution.

The absorbed sulphur dioxide may be liberated in any suitable manner. Preferably, the solution is heated to a temperature sufficiently high to bring about a rapid evolution of sulphur dioxide, but not high enough to cause substantial vaporization of the weak acid.

Liberation of sulphur dioxide may be carried out at atmospheric pressures or at pressures below atmospheric. When the weak acid employed is volatile at the boiling point of the solution produced in the absorption operation, liberation of the sulphur dioxide should be carried out at a temperature below the boiling point of the solution. Any suitable temperature from the absorption temperature to the boiling temperature of the solution may be employed for liberating the sulphur dioxide. Rapid and effective liberation and recovery of sulphur dioxide may be accomplished by employing a weak acid which is stable and non-volatile at the boiling temperature of the solution and heating the solution to the boiling temperature.

The apparatus employed in carrying out a process of the invention should be so arranged that available heat may be utilized efficiently. Thus, for example, when hot roaster gases are being treated, the heat contained in the gases should be utilized for heating the bisulphite solution from which sulphur dioxide is to be liberated, and the cold bisulphite solution produced in the absorption operation should be utilized for cooling the regenerated absorption solution, after liberation of the sulphur dioxide to avoid wasting the heat contained therein.

The bisulphite solution may be heated in any suitable manner to effect liberation of the absorbed sulphur dioxide. Thus, for example, the solution may be heated in a closed vessel out of contact with other gases, or the solution may be heated by contact with a body or current of another gas to which it is desired to transfer the sulphur dioxide. The gaseous product formed by heating the sulphite solution out of contact with other gases is substantially pure sulphur dioxide and it may be utilized for a suitable industrial purpose directly (diluted or undiluted) or it may be cooled to a suitable temperature and compressed to form liquid sulphur dioxide.

We claim:

1. The process of recovering sulphur dioxide from gases containing the same which comprises treating the gases with an aqueous liquid containing in solution a sulphite and an acid stronger than water and weaker than sulphurous acid to effect absorption of the sulphur dioxide with the production of a bisulphite, and heating the solution to liberate absorbed sulphur dioxide, the acid employed being stable and substantially non-volatile at the temperature of liberation, existing in the solution independently of the action of sulphur dioxide and being employed in an amount not less than that equivalent to about 68 grams of lactic acid per liter and capable of affecting positively the rate of liberation of sulphur dioxide from the absorption solution under the influence of heat.

2. In a process for recovering sulphur dioxide from gases containing the same in which the gases treated with an aqueous solution of ammonium sulphite to effect absorption of the sulphur dioxide with the production of ammonium bisulphite, and the resulting solution is heated to liberate sulphur dioxide, the improvement which comprises incorporating in the solution a water-soluble acid stronger than water and weaker than sulphurous acid to inhibit hydrolysis of the ammonium sulphite and to expedite the liberation of sulphur dioxide under the influence of heat, the acid employed being stable and substantially non-volatile at the temperatures employed in the process, being employed in an amount not less than that equivalent to about 68 grams of lactic acid per liter, and existing in the solution independently of the action of sulphur dioxide.

3. In a process for recovering sulphur dioxide from gases containing the same in which the gases treated with an aqueous solution of ammonium sulphite to effect absorption of the sulphur dioxide with the production of ammonium bisulphite, and the resulting solution is boiled to liberate sulphur dioxide, the improvement which comprises incorporating in the solution a water-soluble acid stronger than water and weaker than sulphurous acid to inhibit hydrolysis of the ammonium sulphite and to expedite the liberation of sulphur dioxide under the influence of heat, the acid employed being stable and substantially non-volatile at the temperatures employed in the process, and being employed in an amount not less than that equivalent to about 68 grams of lactic acid per liter.

RAYMOND F. BACON.
ROCCO FANELLI.